(12) United States Patent
Khnifes et al.

(10) Patent No.: US 11,255,669 B1
(45) Date of Patent: Feb. 22, 2022

(54) DEVICE AND METHOD FOR MARKING INDICIA ON TERRESTRIAL SURFACES IN TOPOGRAPHICAL SURVEYING

(71) Applicant: Shadi Khnifes, Shefaram (IL)

(72) Inventors: Shadi Khnifes, Shefaram (IL); Khalil Khnifes, Shefaram (IL)

( * ) Notice: Subject to any disclaimer, the term of this patent is extended or adjusted under 35 U.S.C. 154(b) by 0 days.

(21) Appl. No.: 17/096,427

(22) Filed: Nov. 12, 2020

(51) Int. Cl.
| | |
|---|---|
| *G01C 15/04* | (2006.01) |
| *B05B 12/20* | (2018.01) |
| *B05B 12/00* | (2018.01) |
| *B05B 1/14* | (2006.01) |
| *G01C 15/02* | (2006.01) |

(52) U.S. Cl.
CPC ............ *G01C 15/04* (2013.01); *B05B 1/14* (2013.01); *B05B 12/002* (2013.01); *B05B 12/20* (2018.02); *G01C 15/02* (2013.01)

(58) Field of Classification Search
CPC ..................................................... G01C 15/04
See application file for complete search history.

(56) References Cited

U.S. PATENT DOCUMENTS

| | | | | |
|---|---|---|---|---|
| 4,013,231 | A * | 3/1977 | Van Veldhoven | B65D 83/205 239/579 |
| 6,294,022 | B1 | 9/2001 | Eslambolchi et al. | |
| 6,425,186 | B1 * | 7/2002 | Oliver | G01C 15/02 33/264 |
| 8,060,344 | B2 * | 11/2011 | Stathis | G01C 15/002 703/1 |
| 8,656,857 | B2 | 2/2014 | Carrette | |
| 8,770,140 | B2 | 7/2014 | Nielsen et al. | |
| 9,085,007 | B2 * | 7/2015 | Olsson | B05B 15/62 |
| 9,233,751 | B2 | 1/2016 | Metzler | |
| 9,747,698 | B2 | 8/2017 | Stathis | |
| 10,048,069 | B2 | 8/2018 | Romero et al. | |
| 10,059,504 | B2 * | 8/2018 | Olsson | B65D 83/203 |
| 10,315,834 | B2 * | 6/2019 | Carrette | E01C 23/227 |
| 2010/0272885 | A1 | 10/2010 | Olsson et al. | |
| 2020/0123718 | A1 * | 4/2020 | Hutter | E01C 23/22 |

FOREIGN PATENT DOCUMENTS

WO        2020088768        5/2020

* cited by examiner

*Primary Examiner* — Michael A Berns
(74) *Attorney, Agent, or Firm* — Mark David Torche; Patwrite Law

(57) ABSTRACT

A device and method for marking indicia on terrestrial surfaces implemented in topographical surveying comprises is described; the device includes: a support element connectable to topographic surveying instrument, a container holder and paint container; an actuator; at least one nozzle configured to reversibly assume: a divergent configuration and convergent configuration; at least one driving mechanism, for driving the nozzle between the divergent configuration and convergent configurations and an outlet to dispense the paint on the terrestrial surface; the method includes: selecting a point of interest on a terrestrial surface; positioning the pointed tip; determining geographical coordinates; activating the actuator, dispensing the paint form the outlet; altering the configuration of the nozzle between the divergent and convergent configuration.

20 Claims, 8 Drawing Sheets

DEVICE AND METHOD FOR MARKING INDICIA ON TERRESTRIAL SURFACES IN TOPOGRAPHICAL SURVEYING

TECHNICAL FIELD

In general, the present invention pertains to the art of topographical surveying and marking devices. In particular, the invention relates to device and method for marking indicia on terrestrial surfaces implemented in topographical surveying.

BACKGROUND ART

It is believed that the current state of the art is represented by the following patent literature: U.S. Pat. Nos. 6,294,022, 8,060,344, 8,656,857, 8,770,140, 9,233,751, 9,747,698, U.S. Ser. No. 10/048,069, US20100272885, WO2020088768, US2020123718.

U.S. Pat. No. 9,747,698 that is believed to represent the closest prior art discloses a master station and a substation under the control of the Master station is able to generate graphical drawings of a multidimensional space in real time. Information regarding the physical dimensions of a multi-dimensional space and location an orientation objects and/or structures therein are exchanged between the stations. In U.S. Pat. No. 9,747,698 the master station is able to automatically generate an N dimensional graphical representation of the multidimensional space in real time, i.e., as it receives information from the substation and as it obtains information with its own measurement devices. In U.S. Pat. No. 9,747,698 the master station can display the multidimensional space to a user allowing the user to be guided (i.e., to navigate) within the multidimensional space.

U.S. Pat. No. 8,770,140 that is believed to represent the closest prior art discloses a marking device to perform a marking operation may be acquired from one or more input devices, logged/stored in local memory of a marking device, formatted in various manners, processed and/or analyzed at the marking device itself, and/or transmitted to another device (e.g., a remote computer/server) for storage, processing and/or analysis. In U.S. Pat. No. 8,770,140, a marking device may include one or more environmental sensors and/or operational sensors, and the marking information may include environmental information and operational information derived from such sensors. In U.S. Pat. No. 8,770,140 environmental and/or operational information may be used to control operation of the marking device, assess out-of-tolerance conditions in connection with use of the marking device, and/or provide alerts or other feedback. In U.S. Pat. No. 8,770,140 additional enhancements are disclosed relating to improving the determination of a location (e.g., GPS coordinates) of a dispensing tip of the marking device during use, a group/solo mode, and tactile functionality of a user interface.

SUMMARY OF THE INVENTION

The fallowing summary of the invention is provided in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

The invention was made in view of the deficiencies of the prior art and provides systems, methods and processes for overcoming these deficiencies. According to some embodiments and aspects of the present invention, there is provided a method for marking indicia on terrestrial surfaces implemented in topographical surveying.

According to some embodiments and aspects of the present invention, there is provided a device for marking indicia on terrestrial surfaces implemented in topographical surveying.

According to some embodiments of the present invention, the marking device indicia includes a rod operationally connecting to a topographical surveying device configured for determining the geographical coordinates of the device.

In some embodiments, the marking device indicia includes a shaft positioned on the geographical coordinate to be marked, of the point of interest, onto which a rod has been placed. In some embodiments, the marking device indicia includes an actuator configured for dispensing paint to form at least one indicium on terrestrial surface, by pressing and/or releasing and/or manipulating the actuator.

In some embodiments, the marking device indicia includes at least one aerosol paint container operationally connectable to the actuator, configured to dispense a stream of paint and to mark desired indicia on terrestrial surfaces. Typically, at least one aerosol paint is placed in a holder that can be spread apart to insert aerosol paint container.

In some embodiments, the marking device indicia includes a sheath connected to the shaft, configured to support the actuator and at least one aerosol paint disposed in at least one holder.

In some embodiments at least one nozzle connected to the sheath is displaceable offset the center e configured for releasing paint for marking various straight line including indicia.

In some embodiments at least one nozzle connected displaceable offset the center line is configured for been rotated and releasing paint for marking various circle and/or arcs including indicia.

In some embodiments at least one nozzle disposed at the center line is configured for releasing paint for marking center point including indicia.

In some embodiments at least one nozzle disposed at the center line is configured for releasing paint for marking center point including indicia.

In some embodiments the rod or shaft of the device of the invention forms an integral part of the topographical surveying device, whereas in other embodiments the rod and/or shaft of the device are/is modular and/or exchangeable/interchangeable and/or retrofittable with the rod of the topographical surveying device.

In some embodiments the at least one nozzle displaceable offset the center line is driven by a pushing mechanism, whereas in other embodiments the rod the at least one nozzle displaceable offset the center line is driven by a pulling mechanism.

In some embodiments the device for marking indicia on terrestrial surfaces implemented in topographical surveying includes: at least one support element, defining a centerline of the indicia marking device, selected from: a rod terminating or shaft terminating with essentially pointed tip, operationally connectable to a topographic surveying instrument configured; at least one holder, mountable onto the at least one support element, configured to accommodate a paint container; at least one pre-pressurized paint container, including a discharge nozzle configured to controllably discharge a stream of paint from the container; an actuator configured for manipulating the discharge nozzle of the container, to dispense the stream of the paint from the container; at least one nozzle operationally connectable to the at least one support element, in which the at least one nozzle is configured to reversibly assume: a divergent configuration, in which the at least one nozzle is disposed essentially alongside the centerline; a convergent configuration, in which the at least one nozzle is disposed essentially offset the centerline; at least one driving mechanism selected from the group consisting of: a pushing mechanism; a pulling mechanism; in which the at least one mechanism is configured for driving the at least one nozzle between the divergent configuration and the convergent configuration; at last one outlet disposed at a terminal portion of the at least one nozzle, operationally connectable to the discharge nozzle of the paint container, configured to dispense the paint on a terrestrial surface, to mark a desired indicium thereon.

In some embodiments the pushing mechanism includes a sheath disposed over the support element.

In some embodiments the pulling mechanism includes at least one string connected to the at least one nozzle.

In some embodiments the actuator is disposed over the sheath.

In some embodiments the at least one nozzle includes a plurality of nozzles, further includes a manifold operationally interconnecting the at least one nozzle, with the discharge nozzle of the paint container.

In some embodiments the at least one nozzle includes a plurality of nozzles, further includes a selector configured for controllably obstructing a flow of the paint from the discharge nozzle of the paint container, to an outlet of at least one nozzle.

In some embodiments the device is configured for marking indicia selected from the group consisting of: straight lines including indicia, circular indicia and arcuate indicia.

In some embodiments the device further includes at least one biasing means, configured for driving the at least one nozzle by default into the divergent configuration or the convergent configuration.

In some embodiments the device is configured for marking a at least one indicium selected from the group consisting of: an essentially X-shaped indicium, essentially T-shaped indicium, essentially O-shaped indicium, essentially C-shaped indicium, essentially I-shaped indicium and essentially i-shaped indicium.

In some embodiments the device further includes an outlet disposed adjacently to the pointed tip of the support element, configured for marking a center point including indicia.

In some embodiments the method for marking indicia on terrestrial surfaces implemented in topographical surveying includes the steps of: providing a device for marking indicia on terrestrial surfaces; selecting a point of interest on a terrestrial surface; positioning the pointed tip of the support element onto the point of interest; determining geographical coordinates of the point of interest; activating the actuator, so as to dispense the paint form the outlet; altering a configuration of the at least one nozzle between the divergent configuration or the convergent configuration.

In some embodiments the method further includes vertically translating the sheath reversibly in upward and downward direction, to drive the at least one nozzle between the divergent configuration and the convergent configuration.

In some embodiments the method further includes reversibly pulling and releasing the at least one string, to drive the at least one nozzle between the divergent configuration and the convergent configuration.

In some embodiments the activating includes swinging the actuator over the sheath.

In some the method further includes simultaneously dispense the paint from the plurality of nozzles.

In some embodiments the method further includes controllably dispense the paint from the outlet of the at least one nozzle, controllably selected from the plurality of nozzles.

In some embodiments the method further includes rotating the at least one nozzle about the centerline, whilst the at least one nozzle is in the divergent conformation, to mark indicia selected from the group consisting of: circular indicia and arcuate indicia.

In some embodiments the method further includes reversibly releasing the mechanism, for a biasing means to drive the at least one nozzle between the divergent configuration and the convergent configuration.

In some embodiments the method further includes marking a at least one indicium selected from the group consisting of: an essentially X-shaped indicium, essentially T-shaped indicium, essentially O-shaped indicium, essentially C-shaped indicium, essentially I-shaped indicium and essentially i-shaped indicium.

In some embodiments the method further includes controllably dispensing the paint from an outlet disposed adjacently to the pointed tip of the support element, to mark a center point including indicia.

Definitions

The term "terrestrial surfaces", as referred to herein, should be construed as any natural and/or artificial essentially solid surface, including, but not limited to: bare soil, grass, sidewalks and driveways. The term "terrestrial surfaces", typically doesn't include non-solid surfaces, such as the upper surface of water bodies, such as lakes, rivers, seas, etc. The term "terrestrial surfaces", may however include solid surfaces of water bodies, such as frozen ice surface of water bodies.

The term "topographic surveying", as referred to herein, should be construed as including locating or determining at least one geographic feature or property of a given point on the terrestrial surface, related to topographic depicting of any natural features and elevations on the terrestrial surface. Typically topographic surveys in essence is a three-dimensional map of a solid three-dimensional property showing all natural and/or man-made features and improvements. Specifically, a topographic survey may show location, size, height and any changes in elevation on the terrestrial surface. Topographic surveys, also known as contour surveys, may be required as part of real estate transactions, civil engineering design and construction projects, including: new construction, remodeling projects to existing structures, utility design, road or bridge design or improvements, grading or drainage projects.

The term "topographic surveying instrument" relates to devices known in the art, for measurements in topographic surveys, which are typically done with a surveying-quality GPS unit or with an electronic distance measurement (EDM) instrument. The results of the topographic survey are often presented as contour lines on a site map, which can be enhanced by computer software to provide interactive views. CAD specialists are able to input this data to model showing how the topography may change through planned actions. Topographic surveying instrument are used to determine and plan features such as drainage ditches, grading, or other features, using the natural landscape as the basis for such improvements. An exemplary topographic surveying instrument includes a total station (TS) or total station theodolite (TST) that is an electronic/optical instrument used for surveying and building construction. TS or TST is an electronic transit theodolite integrated with electronic distance measurement (EDM) to measure both vertical and horizontal angles and the slope distance from the instrument to a particular point, and an on-board computer to collect data and perform triangulation calculations.

The term "biasing means" or alike, as referred to herein, should be construed as including any material, structure or mechanism, configured to accumulate mechanical energy, by changing the configuration thereof, upon a force exerted thereon, such as a compressive, tensile, shear or torsional force, and for releasing the energy accumulated therein, by returning to the normal configuration thereof and by performing a mechanical work, typically by linear or radial displacement. Examples of "biasing means" in a non-limiting manner include, springs, elastomers, leaf-springs, coil-springs, tension/extension spring, compression spring torsion spring, constant spring, variable spring, variable stiffness spring, flat spring, machined spring, serpentine spring, garter spring, cantilever spring, helical spring, hollow tubing springs, volute spring, V-spring, belleville washer or belleville spring, constant-force spring, gas spring, mainspring, negator spring, progressive rate coil springs, rubber band, spring washer and wave spring.

The term "user" refers to an individual utilizing the topographic surveying instrument and/or the marking device of the invention and may include, but is not limited to, land surveyors, locate technicians and support personnel.

The term "indicia", as referred to herein, should be construed as any signs, indications or distinguishing marks.

DESCRIPTION OF THE DRAWINGS

The present invention will be understood and appreciated more comprehensively from the following detailed description taken in conjunction with the appended drawings in which.

Figure 1A:
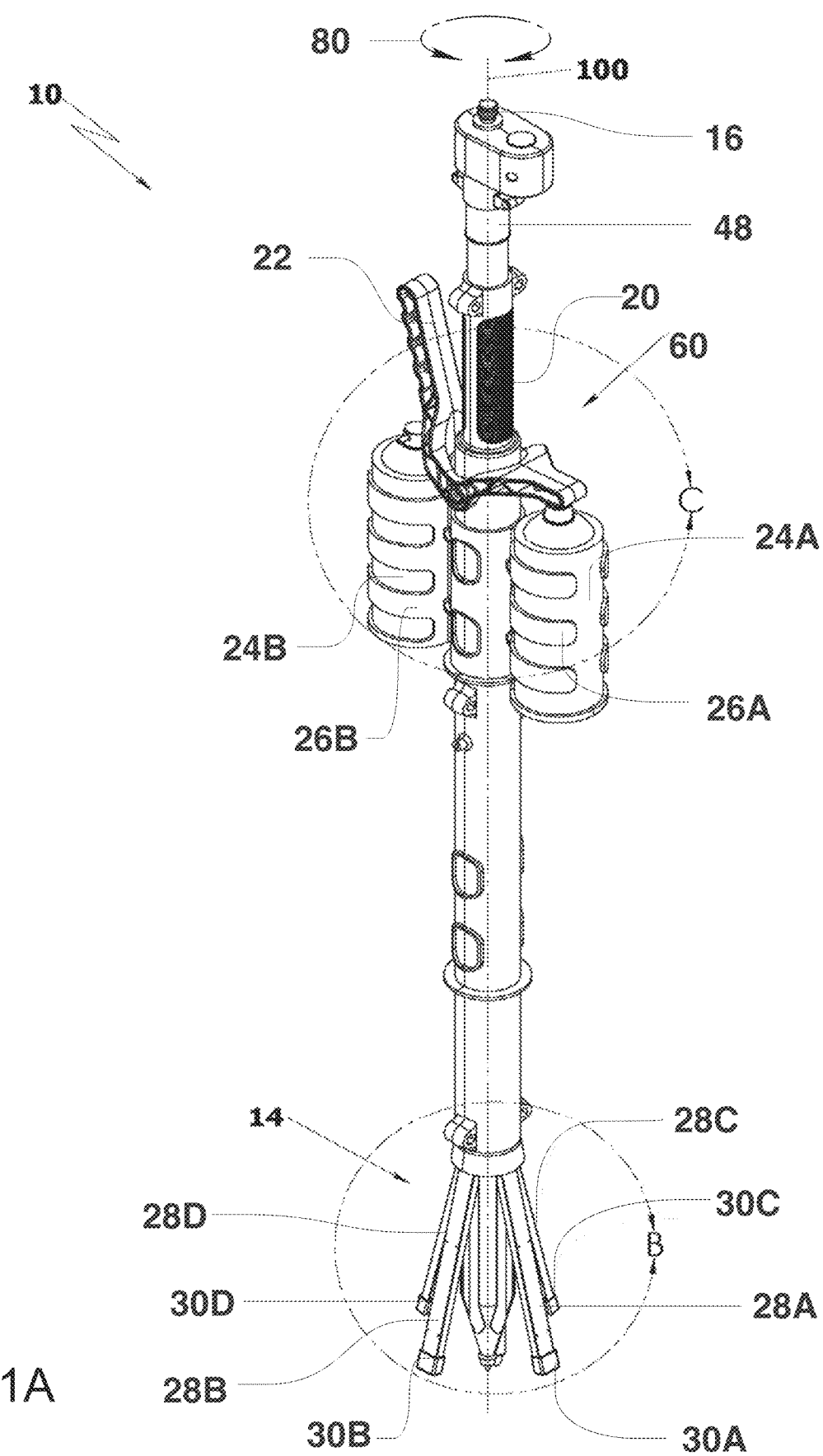
FIG. 1A is an isometric view of the device for marking indicia on terrestrial surfaces implemented in topographical surveying, in the divergent configuration, according to some embodiments of the present invention.

While the invention is susceptible to various modifications and alternative forms, specific embodiments thereof have been shown merely by way of example in the drawings. The drawings are not necessarily complete and components are not essentially to scale; emphasis instead being placed upon clearly illustrating the principles underlying the present invention.

DETAILED DISCLOSURE OF EMBODIMENTS

Illustrative embodiments of the invention are described below. In the interest of clarity, not all features of actual implementation are described in this specification. It should be appreciated that various features or elements described in the context of some embodiment may be interchangeable with features or elements of any other embodiment described in the specification. Moreover, it will be appreciated that for the development of any actual embodiment, numerous implementation-specific decisions must be made to achieve the developers' specific goals, such as compliance with technology- or business-related constraints, which may vary from one implementation to another, and the effort of such a development might be complex and time-consuming, but would nevertheless be a routine undertaking for those of ordinary skill in the art having the benefit of this disclosure.

Figure 1B:
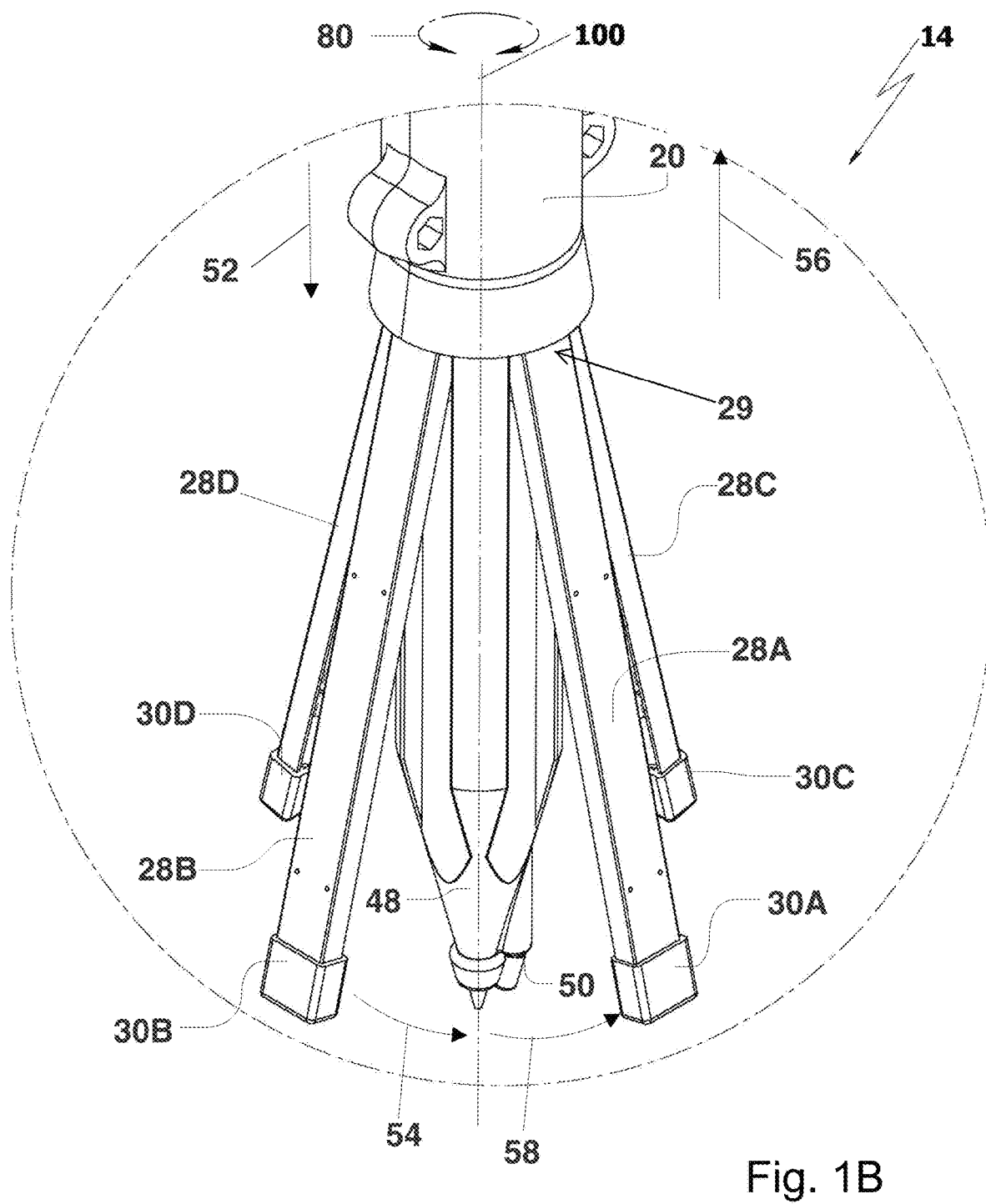
FIG. 1B is an enlarged partial isometric view of the bottom portion of the device, configured for marking indicia on terrestrial surfaces, shown in FIG. 1A, where the swinging nozzles of the device are in the divergent configuration, according to some embodiments of the present invention.
Figure 1C:
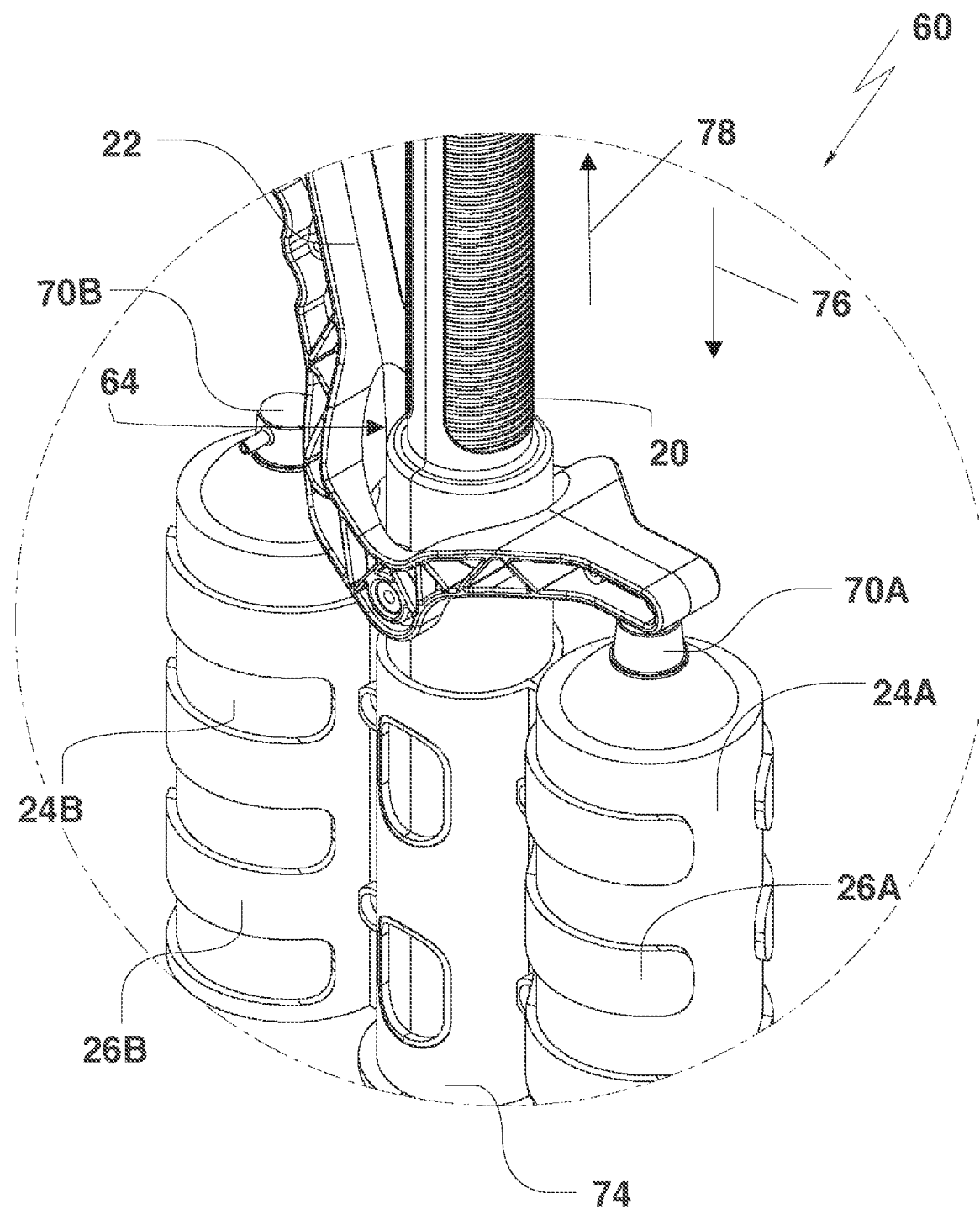
FIG. 1C is an enlarged partial isometric of the top portion of the device, configured for marking indicia on terrestrial surfaces, shown in FIG. 1A, according to some embodiments of the present invention.
Figure 1D:
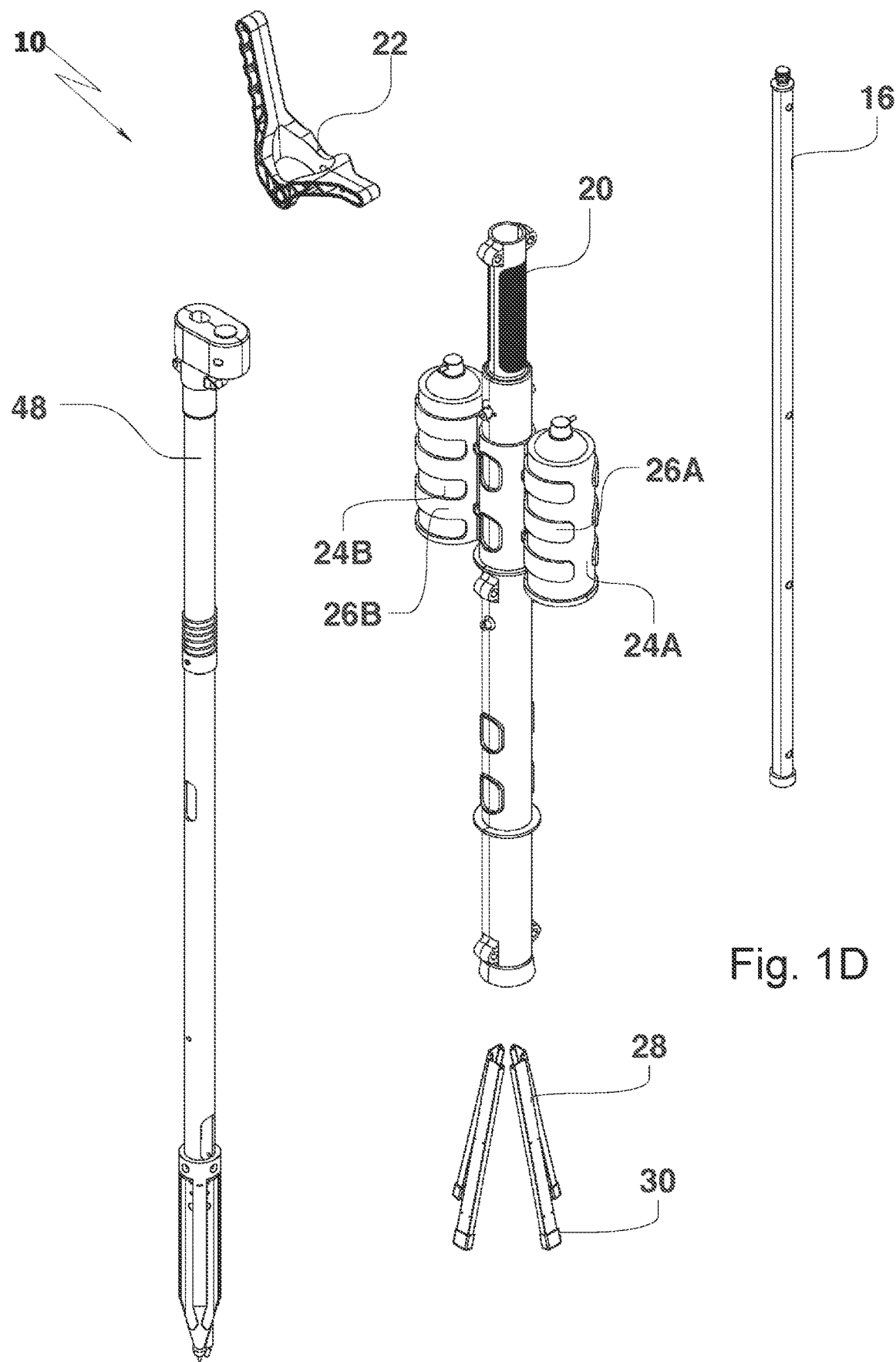
FIG. 1D is an exploded isometric view of the device for marking indicia on terrestrial surfaces implemented in topographical surveying, according to some embodiments of the present invention.
Figure 1E:
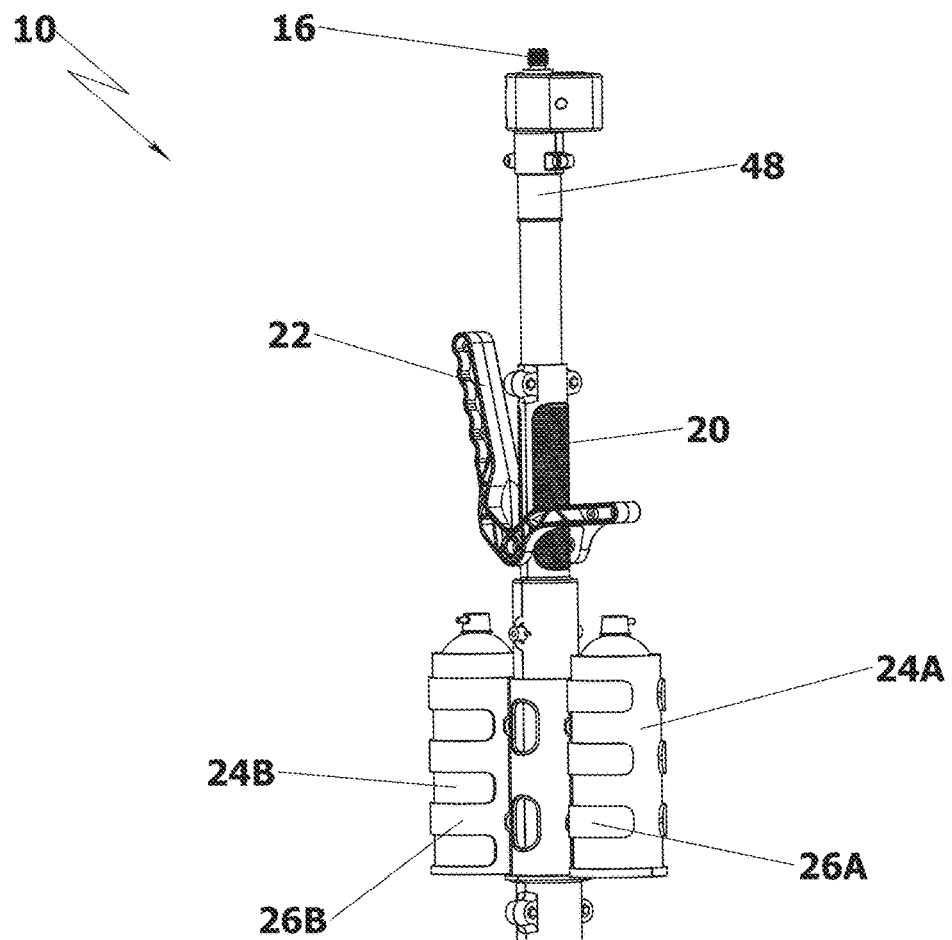
FIG. 1E is an isometric view of the device for marking indicia on terrestrial surfaces implemented in topographical surveying in a convergent configuration, according to some embodiments of the present invention.

In accordance with some embodiments of the present invention, reference is now made to FIGS. 1A and 1E, showing respectively an isometric view of device 10 for marking indicia on terrestrial surfaces implemented in topographical surveying in a divergent configuration in FIG. 1A, as well as an isometric view of device 10 for marking indicia on terrestrial surfaces implemented in topographical surveying in a convergent configuration in FIG. 1E. In some embodiments, device 10 includes rod 16. Rod 16 of device 10 is operationally connectable to a topographic surveying instrument (not shown) configured for determining geographical coordinates.

In some examples, topographic surveying instrument may include a global positioning system (GPS) receiver or a global navigation satellite system (GNSS) receiver. First the receiver computes and subsequently projects the point to the terrestrial surface taking into account the height difference. In some embodiments, the operation is performed by a user that handles the topographical surveying device, placing the bottom end on a desired point of interest for obtaining the three-dimensional position coordinates.

In some embodiments, device 10 further includes shaft 48. Shaft 48 is configured to operate the marking device while in an upright position. Rod 16 is disposed inside and along a length of shaft 48 which is in turn is optionally disposed inside sheath 20. Rod 16 optionally forms an integral or modular part of shaft 48.

In some embodiments device 10 further includes actuator 22. Actuator 22 provides a convenient grip by which the user may operate device 10 during use. In some embodiments, the user activates or deactivates device 10 by pressing or releasing actuator 22.

In some embodiments, device 10 further includes at least one or a pair of aerosol paint cans 24A and 24B. Aerosol paint 24A and/or 24B are/is optionally of a commercially available type widely manufactured for various purposes. In some embodiments, aerosol paint 24A and/or 24B are/is optionally of a specific type configured for making marks on terrestrial surfaces, such as retro-reflective paint, where the nozzles of paint cans 24A and 24B are of a non-standard commercially non-available shape.

In some embodiments, aerosol paint 24A and 24B dispense a stream of paint into a flexible, typically silicone tubing (not shown), disposed along the vertical axis of sheath 20, intended to mark desired indicia on terrestrial surfaces. Aerosol paint 24A and 24B are optionally placed in holders 26A and 26B respectively that are preferably placed vis-à-vis each other, so as counterbalance the weight of aerosol paint 24A and 24B.

In some embodiments, device 10 further includes nozzles 28A and/or 28B and/or 28C and/or 28D. Nozzles 28A and/or 28B and/or 28C and/or 28D are operationally connectable to sheath 20. Nozzles 28A and/or 28B and/or 28C and/or 28D are connected by a hinged connection to shaft 48 at top portion 29, thereby sustaining pivotably swinging the bottom end of nozzles 28A and/or 28B and/or 28C and/or 28D towards centerline 100 into the convergent configuration of FIG. 1E and/or away centerline 100 into the divergent configuration of FIG. 1A. Nozzles 28A and/or 28B and/or 28C and/or 28D at the bottom ends thereof comprise outlets 30A and/or 30B and/or 30C and/or 30D respectively. In some embodiments, device 10 further includes outlet 50 which is placed adjacently to centerline 100.

Figure 1F:
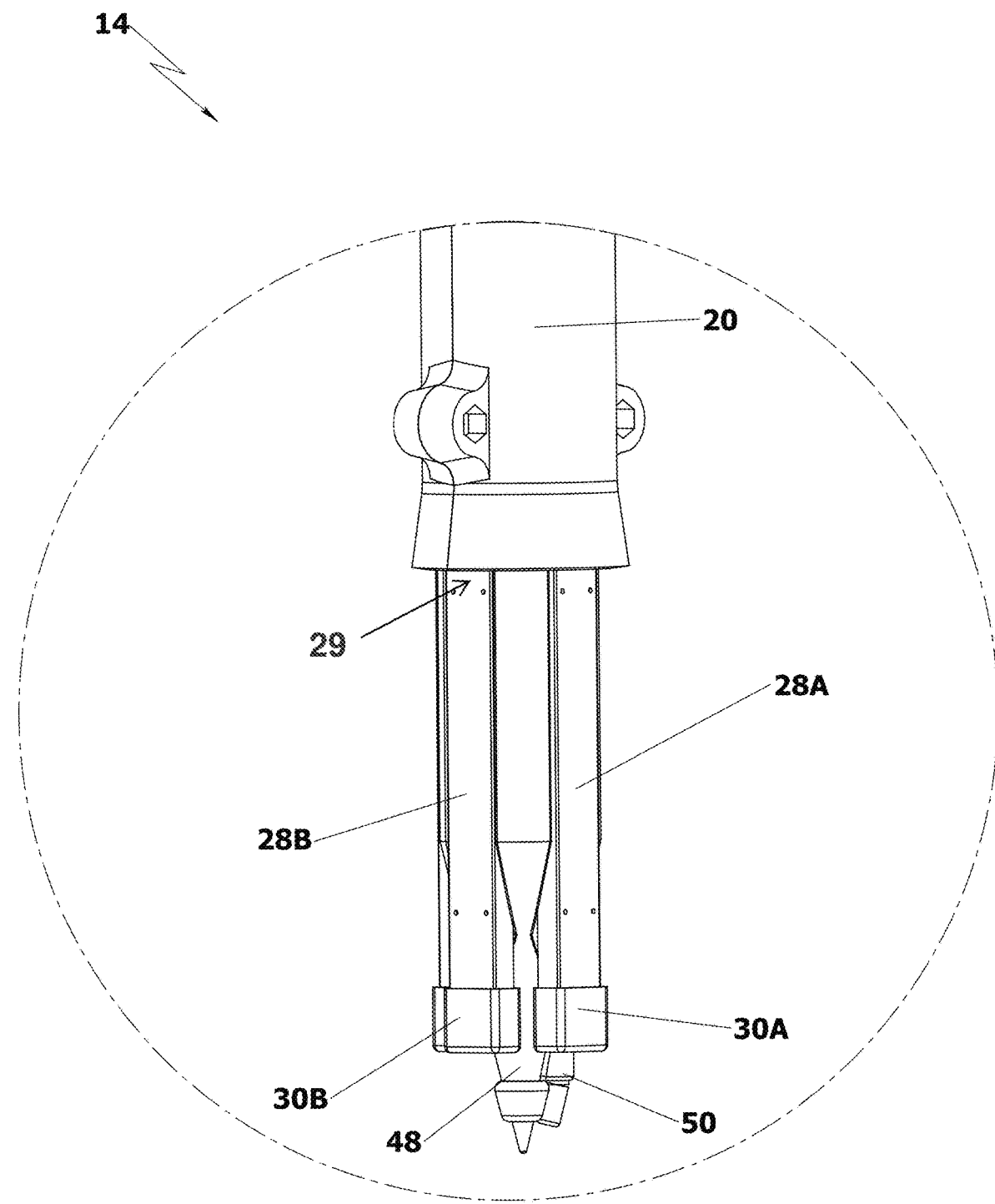
FIG. 1F is an enlarged partial isometric view of the bottom portion of the device, configured for marking indicia on terrestrial surfaces, shown in FIG. 1A, where the swinging nozzles of the device are in the convergent configuration, according to some embodiments of the present invention.

In accordance with some embodiments of the present invention, reference is now made to FIG. 1B, which is an enlarged partial isometric view of the bottom of device 10 shown in FIG. 1A, showing bottom portion 14 of device 10 in a divergent configuration, as well as FIG. 1F, which is an enlarged partial isometric view of the bottom of device 10 shown in FIG. 1E, showing bottom portion 14 of device 10 in a convergent configuration. In some embodiments, bottom portion 14 of device 10 shown in FIGS. 1B and 1F includes sheath 42. Sheath 42 at bottom portion 14 of device 10 is operationally connectable to at least one of four nozzles 28A and/or 28B and/or 28C and/or 28D. Nozzles 28A and/or 28B and/or 28C and/or 28D terminate respectively with outlets 30A and/or 30B and/or 30C and/or 30D configured to release paint for marking indicia.

In some embodiments, bottom portion 14 of device 10 shown in FIG. 1B includes shaft 48. Shaft 48 is configured to operate device while in an upright position. Shaft 48 is disposable inside sheath 42. Shaft 48 optionally includes an outlet 50 configured for marking a center point indicium on terrestrial surfaces.

There are several different mechanisms for marking indicia on terrestrial surfaces. In some embodiments, for marking indicia, the user may push in sheath 42. The user pushes sheath 42 in the direction of arrow 52 to drive nozzles 28A and/or 28B and/or 28C and/or 28D in the direction of arrow 54 towards center line 100 into a convergent configuration, shown in FIGS. 1E and 1F, thus optionally marking straight line including indicia. When the user pulls sheath 42 towards in the direction of arrow 56, nozzles 28A and/or 28B and/or 28C and/or 28D are driven in the direction of arrow 58 offset from center line 100 into a divergent configuration, shown in FIGS. 1A and 1B, thus optionally marking straight line including indicia.

In some embodiments, bottom portion 14 of device 10 includes another mechanism for marking indicia. In some examples, bottom portion 14 of device 10 shown in FIG. 1B includes strings (not shown) connected between each nozzle of nozzles 28A and/or 28B and/or 28C and/or 28D and the center of shaft 48. The strings are drawn upwards along sheath 42 and attached to actuator 22, shown in FIG. 1A. When the user pulls on the strings (not shown), nozzles 28A and/or 28B and/or 28C and/or 28D are drawn and driven towards centerline 100, for example marking an X-shaped indicium. When the user relaces the strings (not shown) nozzles 28A and/or 28B and/or 28C and/or 28D are driven away from centerline 100, for instance by a biasing means driving nozzles 28A and/or 28B and/or 28C and/or 28D by default away from centerline 100, for example marking an X-shaped indicium.

In accordance with some embodiments of the present invention, reference is now made to FIG. 1C, showing top portion 60 of device 10 device which is an enlarged partial isometric view of FIG. 1A, illustrating details of top portion 60 of device 10, configured for marking indicia on terrestrial surfaces. In some embodiments, top portion 60 of device 10 shown in FIG. 1C includes actuator 22. Actuator 22 forms a handle, providing convenient grip by which the user may operate device 10 shown in FIG. 1A during use. In some embodiments, the user activates or deactivates device 10 by pressing or releasing actuator 22. In some embodiments, actuator 22 includes central opening 64 having a diameter sufficient to be disposed over sheath 20. In some embodiments, actuator 22 is pivoted on an axis that is affixed to sheath 20.

In some embodiments, top portion 60 of device 10 shown in FIG. 1C further includes a pair of aerosol paint containers 24A and 24B. Aerosol paint containers 24A and 24B are typically of a commercially available type widely manufactured for the purpose of making various marks. In some embodiments, aerosol paint containers 24A and 24B comprise respectively spray nozzle 70A and spray nozzle 70B, which operationally connectable with actuator 22, to dispense a stream of paint into the tubing (not shown) along the vertical axis of sheath 20, intended to mark desired indicia on terrestrial surfaces. Aerosol paint containers 24A and 24B are placed respectively in holder 26A and 26B which are welded to central tube 74 having a diameter sufficient to be disposed inside sheath 20. Holder 26A or 26B preferably comprise a split semi-cylindrical holder that due to its shape, dimensions and resilient plastic properties can be spread apart to insert aerosol paint containers 24A and 24B.

In some embodiments, spray outlets 30A and/or 30B and/or 30C and/or 30D are of device 10 is connected to a selector and/or manifold (not shown). The inlet of the manifold (not shown) is operationally connectable to the outlets of paint containers 24A and 24B, whereas the furcation outlets of the manifold (not shown) outlets are operationally connectable to outlets 30A and/or 30B and/or 30C and/or 30D of nozzles 28A and/or 28B and/or 28C and/or 28D respectively. The selector (not shown) optionally includes a manifold (not shown), in which each furcation includes at least one baffle and/or clamp, configured to selectively obstruct the flow of through the respective furcation. The manifold is selectively connectable to four connectable to outlets 30A and/or 30B and/or 30C and/or 30D of nozzles 28A and/or 28B and/or 28C and/or 28D respectively, shown in FIG. 1B), so that a selected nozzle or nozzles of nozzles 28A and/or 28B and/or 28C and/or 28D receives the paint for the desired indicia.

In some embodiments, the user presses on actuator 22 which comes into contact with spray nozzles 70A and/or 70B of aerosol paint containers 24A and/or 24B. In some embodiments, actuator 22 is configured to comes into contact selectively, with spray nozzles 70A or 70B of aerosol paint containers 24A or 24B, for instance by swinging the handle actuator 22 into opposite directions.

Spray nozzles 70A and/or 70B is/are operationally connectable to the manifold, through which baffles or clamps of the selector (not shown) selectively release paint to at least one outlet of outlets 30A and/or 30B and/or 30C and/or 30D, shown in FIG. 1B. While remaining pressing on actuator 22, the user pushes sheath 20 in the direction of arrow 76 to drive at least one nozzle of nozzles 28A and/or 28B and/or 28C and/or 28D towards centerline 100, for example marking an X-shaped indicium.

Alternatively or additionally, while remaining pressing on actuator 22, the user pulls sheath 20 in the direction arrow 78, so that at least one nozzle of nozzles 28A and/or 28B and/or 28C and/or 28D are released to be driven, for instance by biasing means (not shown), offset centerline 100, for example marking an X-shaped indicium. In some examples, sheath 20 may be loaded with a coil spring or other biasing means (not shown) which returns it to its starting position when actuator 22 is released.

In accordance with some embodiments of the present invention, reference is now made to FIG. 1D, showing an exploded isometric view of device 10 for marking indicia on terrestrial surfaces implemented in topographical surveying. Device 10 for marking indicia on terrestrial surfaces includes rod 16. Rod 16 is connectable to or forming an integral part of a topographical surveying device configured for determining the geographical coordinates. Typically, the operation of topographical surveying performed by a user that handles the device includes placing the bottom tip of rod 16 onto a desired point of interest for obtaining its three-dimensional position coordinates.

In some embodiments, rod 16 is disposed inside and along a length of shaft 48. Shaft 48 is configured for been operated while in an upright position. Shaft 48 is disposed inside sheath 20. The lower end of shaft 48 preferably includes outlet 50. Outlet 50 is typically connectable to nozzle 70B of aerosol paint container 24B spray nozzle, configured to release paint for marking a center point indicium.

In some embodiments, actuator 22 is disposed over sheath 20. Actuator 22 provides a convenient grip by which the user may carry device 10 during use. In some embodiments, actuator 22 is configured to activate or deactivate device 10 by pressing or releasing actuator 22. In some examples, actuator 22 could be provided in the form of a push button or other type of switch operatively connected to an electrical valve stem actuating mechanism via wires or other conductors.

Figure 2C:
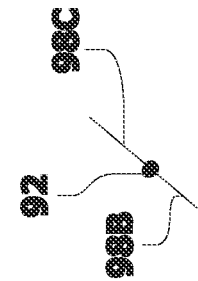
FIG. 2A to 2C are schematic diagrams depicting several forms of indicia markable on terrestrial surfaces implemented in topographical surveying, according to some embodiments of the present invention.
Figure 2B:
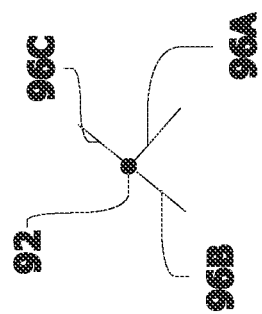
Figure 2A:
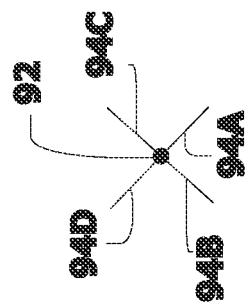

In accordance with some embodiments of the present invention, reference is now made to FIG. 2A to 2C as well as FIG. 3A to 3D showing several exemplary forms of indicia markable on terrestrial surfaces in topographical surveying. In some examples, the user can mark on the terrestrial surface an X-shaped indicium, shown in FIG. 2A. By using four nozzles 28A and 28B and 28C and 28D and discharging the pint from four outlets 30A and 30B and 30C and 30D simultaneously and driving them towards and/or away centerline 100, the user can draw respectively four lines 94A and 94B and 94C and 94D thereby forming an X-shaped indicium, shown in FIG. 2A. Another outlet 50 connected to the end of shaft 48 can be implemented to mark center point indicium 92, in the X-shaped indicium, shown in FIG. 2A.

In some examples, the user can mark on the terrestrial surface a T-shaped indicium shown in FIG. 2B. By using only three nozzles of four nozzles 28A and 28B and 28C and 28D and/or by discharging the paint from only three outlets four outlets 30A and 30B and 30C and 30D, for instance by blocking the discharging via one of four outlets 30A and 30B and 30C and 30D, for instance by the selector, and driving them towards and/or away centerline 100, the user can draw respectively three lines 96A and 96B and 96C, thereby forming a T-shaped indicium, shown in FIG. 2B. Another outlet 50 connected to the end of shaft 48 can be implemented to mark center point indicium 92, in the T-shaped indicium, shown in FIG. 2B.

In some examples, the user can mark on the terrestrial surface a T-shaped indicium shown in FIG. 2C. By using only two nozzles of four nozzles 28A and 28B and 28C and 28D and/or by discharging the paint from only two outlets four outlets 30A and 30B and 30C and 30D, for instance by blocking the discharging via two of four outlets 30A and 30B and 30C and 30D, for instance by the selector, and driving them towards and/or away centerline 100, the user can draw respectively three lines 98A and 98B, thereby forming an I-shaped indicium, shown in FIG. 2C. Another outlet 50 connected to the end of shaft 48 can be implemented to mark center point indicium 92, in the I-shaped indicium, shown in FIG. 2C.

Figure 3D:
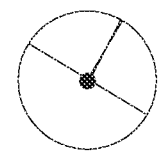
FIG. 3A to 3D are schematic diagrams depicting several forms of indicia markable on terrestrial surfaces implemented in topographical surveying, according to some embodiments of the present invention.
Figure 3C:
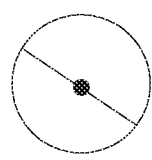
Figure 3B:
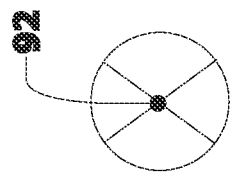
Figure 3A:
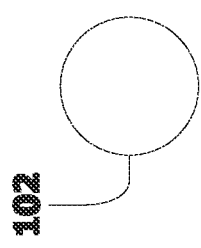

In some examples, the user can mark on the terrestrial surface plain circular or essentially O-shaped indicium 102 shown in FIG. 3A as well as an arcuate portion thereof. Plain circular or essentially O-shaped indicium 102 shown in FIG. 3A is markable on the terrestrial surface upon placing at least one of four nozzles 28A and 28B and 28C and 28D offset centerline 100 and by discharging the paint from at least one of four outlets 30A and 30B and 30C and 30D, while in offset to centerline 100, as well as concomitantly rotating sheath 42 about centerline 100 in the direction of arrow 80 with at least one of four nozzles 28A and 28B and 28C and 28D in offset to centerline 100. As can be seen in FIGS. 3B and 3C, in some examples, the user can mark on the terrestrial surface a plain circular or essentially O-shaped indicium 102 shown in FIG. 3A as well as an arcuate portion thereof in combination with a straight line indicium, such as an X-shaped, T-shaped and/or I-shaped indicia, shown in FIG. 2A to 2D.

Figure 4:
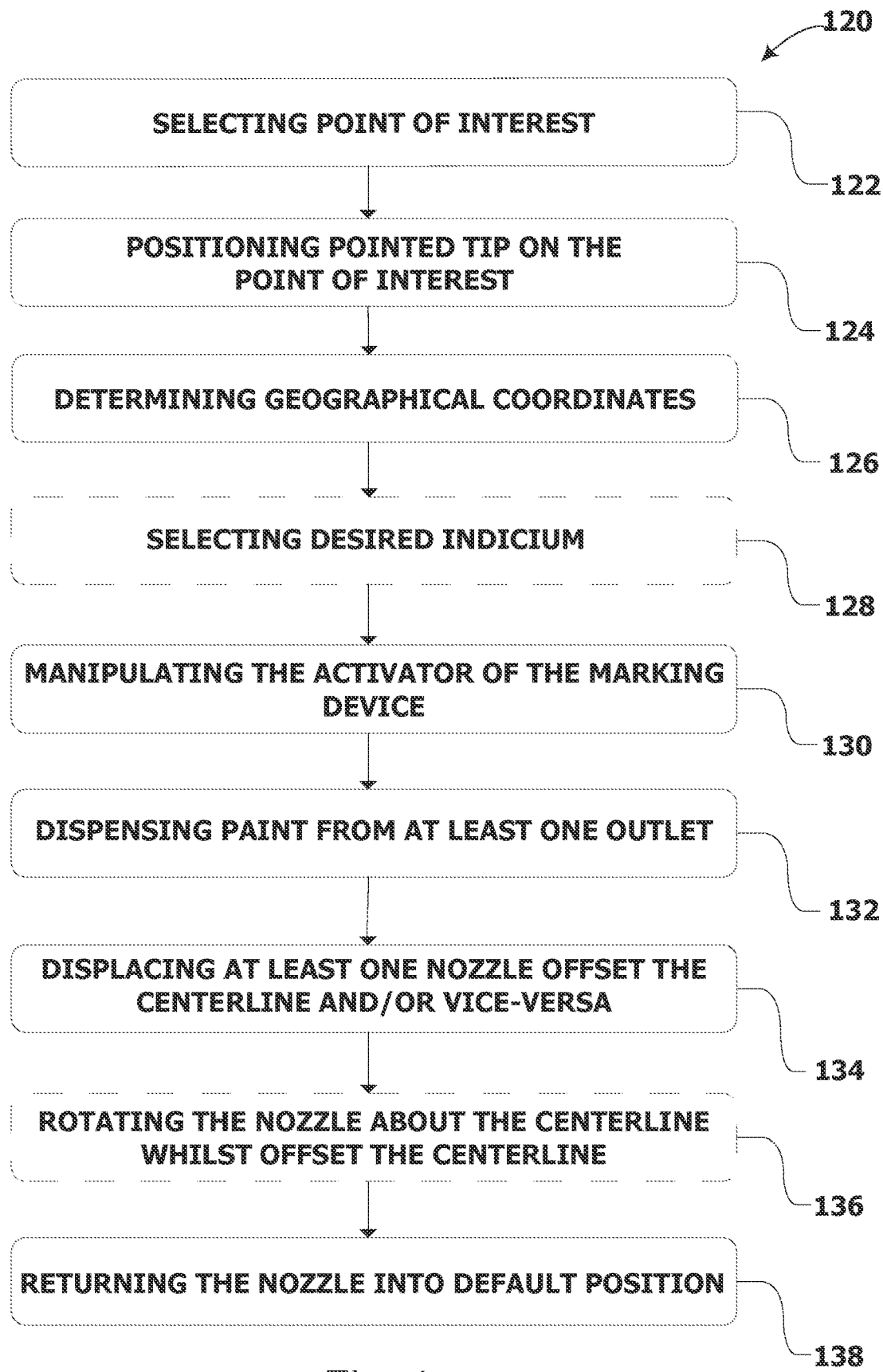
FIG. 4 is a flowchart of the method of indicia markings on terrestrial surfaces implemented in topographical surveying, according to some embodiments of the present invention.

In accordance with some embodiments of the present invention, reference is now made FIG. 4 showing flowchart of method 120. The method of the embodiment of FIG. 4 illustrates various features that may be interchangeable with elements of any other embodiment described in the specification. Method 120 typically commences at step 122, of selecting point of interest for marking indicia on terrestrial surfaces.

In some embodiments, method 120 further proceeds to step 124 of positioning the pointed tip of the shaft or rod onto the selecting point of interest for marking indicia on terrestrial surfaces. Method 120 typically further includes step 126 of determining the geographical coordinates of the point of interest for marking indicia of the terrestrial surface. In some examples, step 126 is achievable by computing and subsequently projecting the point to the terrestrial surface taking into account the height difference.

Step 126 of determining the geographical coordinates of the point of interest on the terrestrial surface optionally includes iteration of step 122 by re-selecting and/or correcting the selected point of interest. Step 126 of determining the geographical coordinates of the point of interest on the terrestrial surface optionally includes iteration of step 124 by positioning the pointed tip of the shaft or rod onto the re-selected and/or correct point of interest is located.

In some embodiments, method 120 further includes optional step 128 of selecting desired indicium. In some examples, step 128 is achievable by the manipulating of a selector, so as to select the specific nozzle or nozzles receiving the paint, necessary for marking the desired indicium. In some embodiments, method 120 further includes step 130 of manipulating the actuator of the marking device, thereby dispensing the paint from at least one paint container, to form the selected indicium on the terrestrial surface. In some examples, step 128 is achievable by pressing or pulling the actuator.

In some embodiments, method 120 further includes step 132 of dispensing a stream of paint from at least one outlet, thereby making the selected indicium on the terrestrial surface. In some examples, step 132 is achievable by pressing on the actuator of the marking device, to contact selectively with spray nozzles of aerosol paint containers, for instance by swinging the handle actuator into opposite directions.

In some embodiments, method 120 further includes step 134 of displacing at least one nozzle offset the centerline. In some examples, step 134 is achievable by pushing and/or pulling the sheath of a pushing mechanism of the marking device to drive at least one nozzle offset from the centerline, thereby marking straight line including indicia. In some examples, step 134 is achievable by releasing the strings of a pulling mechanism of the marking device to drive at least one nozzle, for instance by a biasing means, away from the centerline.

In some embodiments, method 120 further includes optional step 136 of rotating at least one nozzle about centerline. In some examples, step 136 is achievable by placing at least one of four nozzles offset the centerline, discharging the paint from at least one outlet, while the nozzle is in offset to the centerline, as well as by concomitantly rotating the sheath about the centerline with at least one nozzle in offset to the centerline, thereby marking circular or arcuate indicia.

In some embodiments, method 120 further concludes with step 138 of returning the at least one nozzle in the default position. In some examples, step 138 is achievable by pushing/pulling the sheath of the pushing/pulling mechanism of the marking device to drive or release the at least one nozzle into the default conformation. In other examples, step 138 is achievable by pulling on the strings of the pushing/pulling mechanism of the marking device, thereby drawing and/or driving the at least one nozzle into the default conformation.

It will be appreciated by persons skilled in the art that the present invention is not limited by what has been particularly shown and described herein above. Rather the scope of the invention is defined by the claims which follow:

The invention claimed is:

1. A device for marking indicia on a terrestrial surface implemented in topographical surveying comprises:
   (a) a support element terminating with essentially pointed tip, defining a centerline of said indicia marking device, said support element is operationally connectable to a topographic surveying instrument configured for determining geographical coordinates;
   (b) at least one holder, mountable onto said support element, configured to accommodate a paint container;
   (c) at least one pre-pressurized paint container, comprising a discharge nozzle configured to controllably discharge a stream of a paint from said at least one pre-pressurized paint container;
   (d) an actuator configured for manipulating said discharge nozzle of said at least one pre-pressurized paint container, to dispense said stream of said paint from said at least one pre-pressurized paint container;
   (e) at least one swinging nozzle comprising a bottom end from which said paint is discharged and a top portion operationally connectable to said support element, wherein said top portion of said at least one swinging nozzle forms a hinged connection with said support element, and wherein said bottom end of said at least one swinging nozzle is configured to move away and towards said centerline of said support element;
   wherein said at least one swinging nozzle is configured to reversibly assume:
   (I) a convergent configuration, in which said bottom end of said at least one swinging nozzle is disposed essentially alongside said centerline; or
   (II) a divergent configuration, in which said bottom end of said at least one swinging nozzle is disposed essentially offset said centerline;
   (f) at least one driving mechanism selected from the group consisting of:
   (I) a pushing mechanism; and
   (II) a pulling mechanism;
   wherein said at least one driving mechanism is configured for driving said at least one swinging nozzle between said divergent configuration and said convergent configuration;
   (g) at least one outlet disposed at a terminal portion of said at least one swinging nozzle, operationally connectable to said discharge nozzle of said at least one pre-pressurized paint container, configured to dispense said paint from said at least one pre-pressurized paint container on a terrestrial surface, to mark a desired indicium thereon related to the terrestrial surface adjacent to said essentially pointed tip.

2. The device according to claim 1, wherein said pushing mechanism comprises a sheath disposed over said support element, configured to drive said at least one swinging nozzle into said convergent configuration.

3. The device according to claim 2, wherein said actuator is disposed over said sheath.

4. The device according to claim 1, wherein said pulling mechanism comprises at least one string connected to said at least one swinging nozzle.

5. The device, according to claim 1, wherein said at least one swinging nozzle comprises a plurality of nozzles, further comprises a manifold operationally interconnecting said at least one swinging nozzle, with said discharge nozzle of said at least one pre-pressurized paint container.

6. The device according to claim 1, wherein said at least one swinging nozzle comprises a plurality of swinging nozzles, further comprises a selector configured for controllably obstructing a flow of said paint from said discharge nozzle of said at least one pre-pressurized paint container, to said at least one outlet of said at least one swinging nozzle, from said plurality of said swinging nozzles.

7. The device according to claim 1, wherein said device is configured for marking indicia selected from the group consisting of: straight lines comprising indicia, circular indicia and arcuate indicia.

8. The device, according to claim 1, further comprises at least one biasing means, configured for driving said at least one swinging nozzle by default into said divergent configuration or said convergent configuration.

9. The device according to claim 1, wherein said device is configured for marking a at least one indicium selected from the group consisting of: an essentially X-shaped indicium, essentially T-shaped indicium, essentially O-shaped indicium, essentially C-shaped indicium, essentially I-shaped indicium and essentially i-shaped indicium.

10. The device according to claim 1, further comprises a central outlet disposed adjacently to said pointed tip of said support element, configured for marking a center point comprising indicia.

11. A method for marking indicia on a terrestrial surface implemented in topographical surveying comprises the steps of:
  (a) providing a device for marking indicia on a terrestrial surface comprising:
    (I) a support element terminating with essentially pointed tip, said support element is operationally connectable to a topographic surveying instrument, defining a centerline of said indicia marking device;
    (II) at least one container holder, mountable onto said support element;
    (III) at least one paint container, comprising a discharge nozzle;
    (IV) an actuator configured for manipulating said discharge nozzle;
    (V) at least one swinging nozzle comprising a bottom end from which a paint is discharged and a top portion operationally connectable to said support element, wherein said top portion of said at least one swinging nozzle forms a hinged connection with said support element, and wherein said bottom end of said at least one swinging nozzle is configured to move away and towards said centerline of said support element;
  wherein said at least one swinging nozzle is configured to reversibly assume:
    (i) a convergent configuration, in which said bottom end of said at least one swinging nozzle is disposed essentially alongside said centerline; or
    (ii) a divergent configuration, in which said bottom end of said at least one swinging nozzle is disposed essentially offset said centerline;
    (VI) at least one driving mechanism, configured for driving said at least one swinging nozzle between said divergent configuration and said convergent configuration, selected from the group consisting of: a pushing mechanism and a pulling mechanism;
    (VII) an outlet disposed at a terminal portion of said at least one swinging nozzle, configured to dispense said paint on said terrestrial surface, to mark a desired indicium thereon related to the terrestrial surface adjacent to the essentially pointed tip;
  (b) selecting a point of interest on a said terrestrial surface;
  (c) positioning said pointed tip of said at least one support element onto said point of interest;
  (d) determining geographical coordinates of said point of interest;
  (e) activating said actuator, so as to dispense said paint from said outlet;
  (f) altering a configuration of said at least one swinging nozzle between said divergent configuration and said convergent configuration.

12. The method according to claim 11, wherein said pushing mechanism comprises a sheath disposed over said support element, further comprises vertically translating said sheath reversibly in upward and downward direction, to drive said at least one swinging nozzle between said divergent configuration and said convergent configuration.

13. The method according to claim 12, wherein said activating comprises swinging said actuator over said sheath.

14. The method according to claim 11, wherein said pulling mechanism comprises at least one string connected to said at least one swinging nozzle, further comprises reversibly pulling and releasing said at least one string, to drive said at least one swinging nozzle between said divergent configuration and said convergent configuration.

15. The method, according to claim 11, wherein said at least one swinging nozzle comprises a plurality of nozzles and a manifold operationally interconnecting said at least one swinging nozzle, with said discharge nozzle of said paint container, further comprises simultaneously dispense said paint from said plurality of nozzles.

16. The method according to claim 11, wherein said at least one swinging nozzle comprises a plurality of swinging nozzles, further comprising a selector configured for controllably obstructing a flow of said paint from said discharge nozzle of said paint container, to said at least one outlet of said at least one swinging nozzle, said method further comprises controllably dispensing said paint from said at least one outlet of said at least one swinging nozzle, controllably selected from said plurality of said swinging nozzles by said selector.

17. The method, according to claim 11, further comprises rotating said at least one swinging nozzle about said centerline, whilst said at least one swinging nozzle is in said divergent conformation, to mark indicia selected from the group consisting of: circular indicia and arcuate indicia.

18. The method according to claim 11, wherein said device further comprises at least one biasing means, configured for driving said at least one swinging nozzle by default into said divergent configuration or said convergent configuration, further comprises reversibly releasing said driving mechanism, for said biasing means to drive said at least one swinging nozzle between said divergent configuration and said convergent configuration.

19. The method, according to claim 11, further comprises marking a at least one indicium selected from the group consisting of: an essentially X-shaped indicium, essentially T-shaped indicium, essentially O-shaped indicium, essentially C-shaped indicium, essentially I-shaped indicium and essentially i-shaped indicium.

20. The method according to claim 11, wherein said device further comprising a central outlet disposed adjacently to said pointed tip of said at least one support element, said method further comprises controllably dispensing said paint from said central outlet disposed adjacently to said pointed tip of said support element, so as to mark a center point comprising indicia.

\* \* \* \* \*